No. 656,992. Patented Aug. 28, 1900.
J. L. MORTIMER & J. H. WILLIAMS.
DISINFECTANT.
(Application filed Nov. 9, 1897.)
(No Model.)
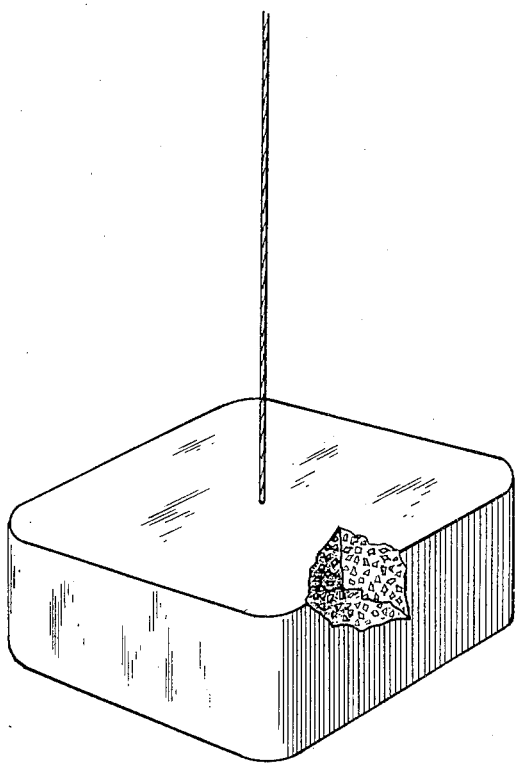
Witnesses
Cassell Severance
D. Reed Clift
Inventors
James L. Mortimer
John H. Williams
by their Atty
Mason Fenwick Lawrence

United States Patent Office.

JAMES LAING MORTIMER AND JOHN HUBERT WILLIAMS, OF LIVERPOOL, ENGLAND.

DISINFECTANT.

SPECIFICATION forming part of Letters Patent No. 656,992, dated August 28, 1900.

Application filed November 9, 1897. Serial No. 657,965. (No specimens.)

*To all whom it may concern:*

Be it known that we, JAMES LAING MORTIMER and JOHN HUBERT WILLIAMS, subjects of the Queen of Great Britain, residing at Liverpool, in the county of Lancaster, England, have invented certain new and useful Improvements in Disinfecting or Antiseptic Blocks, of which the following is a specification.

This invention has for its object a disinfectant block in which an oxidizing salt, such as permanganate, shall be slowly evolved when the block is in water, it being combined with a slowly absorbing or evaporating material, preferably of a quality toxic to microbes, whereby when it is placed in the water of a tank, flush-cistern, urinal, drain, or other like position for long periods it will only very slowly dissolve. We take permanganate of potash or permanganate of soda, preferably in the ordinary crystals, but in some cases it will do in the powdered form, and surround its granules with a material slowly soluble in water or slowly volatile and also preferably of a nature toxic to microbes, so that as this outside material evaporates or is dissolved the crystals of permanganate successively become exposed and subjected to the action of the surrounding liquid, when each in succession rapidly dissolves and assists in oxidizing the putrefying and other deleterious matters in the liquid.

In carrying out our invention we take permanganate of potash or permanganate of soda crystals or other highly-oxidizing salt and heat the same with naphthaline or camphor, disinfecting-soap, or other similar compound or mixture, only slightly soluble in water and not having a chemical effect on the permanganate or other oxidizing salt, and thoroughly mix these materials together till the permanganate is well coated, in some cases heating to about 300° Fahrenheit; but the heat required varies with the compound, and in some instances—as, for instance, where a mixture of naphthaline with a lighter hydrocarbon is used—the block can be mixed and molded in the cold and then left to harden. The mixture, however, is generally transferred in the heated state to molds of the size and shape required and is pressed or allowed to set to the requisite hardness. The materials may be used in very different proportions; but we find a suitable one for general purposes to be seventy-five parts of permanganate to twenty-five parts of one or more of the other ingredients aforesaid. In making the soap combination we mix the permanganate, which can be in the powdered form in this instance, with soap when the latter is in a liquid state, or if we use a milled soap, when in the powdered state, and mold under pressure or otherwise to the required size and shape. The blocks can be shaped to suit any particular trap, drain, sink, flush-pipe, chamber, or cistern for which they may be required. Where the material used with the permanganate is not of a very cohesive nature, the mass is made more coherent by being molded with hydraulic or other heavy pressure. Where, however, there is sufficient coherency in the materials used, all heavy pressure can be dispensed with.

In thus describing our invention we do not confine ourselves to the exact ingredients used. It is desirable in order to lessen the bulk per amount of disinfecting to be done to use binding materials of a disinfecting nature and also of a quality toxic to microbes, so that the disinfecting may be more complete than it would be if oxidizing materials alone were used. It is obvious, however, that a colorable imitation of our invention might be made by using soap of a non-toxic quality (or other binding ingredients) sparingly soluble in water. A soap of this nature is ordinary soap containing a large amount of aluminate of soda or of oleate or stearate of alumina, all three of which chemicals are insoluble in water. Further, the toxic or other material mixed with the permanganate need not be of a binding character, as the whole can be mixed with a cohesive material, such as glue. The principles of our invention, it will therefore be seen, are two: first, the combination of a very soluble material also of a disinfecting character enveloping the crystals of the more soluble salt and allowing them only to enter into solution as their outer coverings of less soluble material are dissolved, and, secondly, the combination of a strongly-oxidizing salt with a less soluble toxic envelop surrounding the granules, which envelop is toxic to microbes.

We are aware that permanganates have previously been placed in vessels with narrow orifices or siphons, and these have been immersed in tanks and the like. Such apparatus, however, involves a large amount of room and usually requires a skilled man to place it in position and remove it. Also we are aware that salts formed by the double decomposition of permanganate with other salts, so as to form a very much less soluble salt than the permanganate, have been proposed for this purpose; but such salts are very expensive and are much less efficient than the simple permanganate. We are also aware that permanganate has been mixed with plaster, clay, and other mineral constituents having no chemical effect, but simply easily washed away by water, so that crystals or minute particles of permanganate are exposed successively to the water or are liquefied in the pores of the substance and caused to exude through it; but this arrangement is defective, owing to the large amount of mineral sediment which is liable to be deposited, and also the permanganate is liable to be dissolved out much more in the earlier stages than later, whereas with our invention the material used being practically impervious to water, though not insoluble, the supply of permanganates at any rate per area of surface is practically uniform.

The drawing shows the block suspended by knotted string.

We declare that what we claim is—

1. As a new article of manufacture, a hard block composed of fragments of an alkaline permanganate bound together by naphthalin, substantially as described.

2. As a new article of manufacture, a hard block composed of fragments of an alkaline permanganate bound together by naphthalin and camphor, substantially as described.

3. As a new article of manufacture, the combination of a slowly-soluble disinfectant-block composed of an alkaline permanganate bound together by naphthalin and camphor and formed around the end of a cord firmly and securely embedded therein, substantially as described, whereby the block can be suspended in a cistern and quickly removed therefrom, substantially as described.

In testimony whereof we have signed our names to this specification in the presence of two subscribing witnesses.

JAMES LAING MORTIMER.
JOHN HUBERT WILLIAMS.

Witnesses:
G. C. DYMOND,
A. C. B. HENRI.